United States Patent
Hsu

(10) Patent No.: US 10,520,048 B2
(45) Date of Patent: Dec. 31, 2019

(54) ROTATION VELOCITY ADJUSTING MODULE, ROTATING DEVICE AND ROTATION VELOCITY ADJUSTING METHOD

(71) Applicant: Wistron Corporation, New Taipei (TW)

(72) Inventor: Sheng-Chia Hsu, New Taipei (TW)

(73) Assignee: Wistron Corporation, New Taipei (TW)

( * ) Notice: Subject to any disclaimer, the term of this patent is extended or adjusted under 35 U.S.C. 154(b) by 24 days.

(21) Appl. No.: 15/586,282

(22) Filed: May 4, 2017

(65) Prior Publication Data

US 2018/0180116 A1 Jun. 28, 2018

(30) Foreign Application Priority Data

Dec. 23, 2016 (TW) .............................. 105143099 A

(51) Int. Cl.
*F16D 49/20* (2006.01)
*B62L 1/00* (2006.01)
(Continued)

(52) U.S. Cl.
CPC ................ *F16D 49/20* (2013.01); *B62K 9/00* (2013.01); *B62L 1/005* (2013.01); *B62L 3/00* (2013.01); *F16D 59/00* (2013.01); *B41J 11/24* (2013.01); *F16D 2127/002* (2013.01); *F16D 2127/005* (2013.01)

(58) Field of Classification Search
CPC .... F16D 49/20; F16D 2127/005; F16D 59/00; B62L 1/005; B41J 2/32; B41J 11/24
See application file for complete search history.

(56) References Cited

U.S. PATENT DOCUMENTS 1,861,824 A * 6/1932 James ................ B65H 19/1831
242/421.7
2,054,095 A * 9/1936 Pitman ..................... B41J 11/24
192/104 C
(Continued)

FOREIGN PATENT DOCUMENTS

| TW | 525736 | 3/2003 |
|---|---|---|
| TW | 1376566 | 11/2012 |
| TW | M527409 | 8/2016 |

OTHER PUBLICATIONS

"Office Action of Taiwan Counterpart Application," dated Oct. 27, 2017, p. 1-p. 7, in which the listed references were cited.

*Primary Examiner* — Melody M Burch
(74) *Attorney, Agent, or Firm* — JCIPRNET

(57) ABSTRACT

A rotation velocity adjusting module includes a fixed axle, a rotating component and a rotation velocity adjusting mechanism. The rotating component is pivoted to the fixed axle. The rotation velocity adjusting mechanism includes a driven component, a driving component and a contact component. The driven component is rotatably connected to the rotating component. The driving component and the contact component are disposed on the driven component. When a rotation velocity of the rotating component reaches a threshold value, the driving component drives the driven component to rotate by the change of centrifugal force, so as to switch states of the contact component.

22 Claims, 11 Drawing Sheets

(51) Int. Cl.
*F16D 59/00* (2006.01)
*B62K 9/00* (2006.01)
*B62L 3/00* (2006.01)
B41J 11/24 (2006.01)
F16D 127/00 (2012.01)

(56) References Cited

U.S. PATENT DOCUMENTS

| | | | | |
|---|---|---|---|---|
| 2,521,178 | A | * | 9/1950 | Moletti .............. B65H 75/4447 15/323 |
| 3,354,993 | A | * | 11/1967 | Der .......................... F16D 59/00 188/82.77 |
| 4,015,696 | A | * | 4/1977 | Lichti ........................ B66F 3/08 188/184 |
| 5,967,443 | A | * | 10/1999 | Green ................ B65H 75/4447 188/185 |
| 8,177,018 | B2 | * | 5/2012 | Coleman .................. B62D 5/04 180/444 |
| 2014/0224597 | A1 | * | 8/2014 | Takezawa ............... B60T 7/126 188/78 |

* cited by examiner

ROTATION VELOCITY ADJUSTING MODULE, ROTATING DEVICE AND ROTATION VELOCITY ADJUSTING METHOD

CROSS-REFERENCE TO RELATED APPLICATION

This application claims the priority benefit of Taiwan application serial no. 105143099, filed on Dec. 23, 2016. The entirety of the above-mentioned patent application is hereby incorporated by reference herein and made a part of this specification.

BACKGROUND OF THE INVENTION

1. Field of the Invention

The disclosure relates to an adjusting module, a rotating device, and an adjusting method. In particular, the disclosure relates to a rotation velocity adjusting module, a rotating device having the rotation velocity adjusting module, and a rotation velocity adjusting method.

2. Description of Related Art

As children's scooters have become popular, focus on the safety for riding the scooters has also increased. For instance, when a scooter passes through a hill too steep or too long, the scooter may become too fast such that a child is unable to slow down the scooter by stepping on the ground. Even if the scooter has a manual emergency break installed, the child usually is unable to correctly operate the manual emergency brake when the scooter is going too fast. On a different note, handheld thermal induction printers are printing apparatuses than can print receipts. The printing paper is winded around a paper roller in the printing apparatus and is transmitted as the paper roller rotates so as to complete printing operations. When the paper roller rotates too fast, noise levels that are generated may be too high, and printing quality may be unfavorable because the printing paper is being transmitted too fast. Thus, an effective automatic rotation velocity adjusting system needs to be designed for the wheels of scooters, rollers of printing apparatuses, and other rotating elements.

SUMMARY OF THE INVENTION

The disclosure provides a rotation velocity adjusting module and a rotation velocity adjusting method that automatically adjusts a rotation velocity of a rotating component.

The disclosure provides a rotating device having a rotation velocity adjusting module that automatically adjusts a rotation velocity of a wheel body.

The rotation velocity adjusting module of the disclosure includes a fixed axle, a rotating component, and at least one rotation velocity adjusting mechanism. The rotating component is pivoted to the fixed axle and rotates with the fixed axle as the rotating axis. The rotation velocity adjusting mechanism includes a driven component, a driving component, and a contact component. The driven component is rotatably connected to the rotating component. The driven component includes a first end and a second end. The driving component is disposed on the first end. The contact component is disposed on the second end. When a rotation velocity of the rotating component reaches a threshold value, the driving component drives the driven component to rotate through the change of centrifugal force, so as to switch a status of the contact component.

In an embodiment of the disclosure, when a rotation velocity of the rotating component is lower than the threshold value, the driven component is positioned at a first status. When a rotation velocity of the rotating component is greater than the threshold value, the driving component drives the driven component to rotate to a second status through centrifugal force.

In an embodiment of the disclosure, when the driven component is in one of the first status and the second status, the contact component is separated from the fixed axle. When the driven component is in the other one of the first status and the second status, the contact component is in contact with the fixed axle.

The rotating device of the disclosure includes a rotation velocity adjusting module, a main body, and a wheel body. The rotation velocity adjusting module includes a fixed axle, a rotating component, and at least one rotation velocity adjusting mechanism. The rotating component is pivoted to the fixed axle and rotates with the fixed axle as the rotating axis. The rotation velocity adjusting mechanism includes a driven component, a driving component, and a contact component. The driven component is rotatably connected to the rotating component. The driven component includes a first end and a second end. When a rotation velocity of the rotating component is lower than a threshold value, the driven component is positioned at a first status. The driving component is disposed on the first end. When the rotation velocity of the rotating component is greater than a threshold value, the driving component drives the driven component to rotate to a second status through centrifugal force. The contact component is disposed on the second end. When the driven component is in one of the first status or the second status, the contact component is separated from the fixed axle. When the driven component is in the other one of the first status or the second status, the contact component is in contact with the fixed axle. The main body is connected to the fixed axle. The wheel body is connected to the rotating component, and is adapted to rotate.

In an embodiment of the disclosure, the rotation velocity adjusting mechanism includes an elastic element. The elastic element is connected between the rotating component and the driven component. When a rotation velocity of the rotating component is lower than a threshold value, the driven component is positioned at a first status through the elastic force of the elastic element. When the rotation velocity of the rotating component is greater than a threshold value, the driving component drives the driven component through centrifugal force to resist the elastic force of the elastic element and rotate to a second status.

In an embodiment of the disclosure, when the driven component is in the first status, the contact component is separated from the fixed axle. When the driven component is in the second status, the contact component is in contact with the fixed axle to reduce the rotation velocity of the rotating component.

In an embodiment of the disclosure, when the driven component is in the first status, the contact component is in contact with the fixed axle. When the driven component is in the second status, the contact component is separated from the fixed axle to increase the rotation velocity of the rotating component.

In an embodiment of the disclosure, when a rotation velocity of the rotating component along a first rotation direction is greater than a threshold value, the driving component drives the driven component through centrifugal force to rotate to a second status. When a rotation velocity of the rotating component along a second rotation direction opposite to the first rotation direction is greater than a threshold value, the driving component drives the driven component through centrifugal force to rotate to the second status.

In an embodiment of the disclosure, the driving component and the contact component are respectively located on two opposite sides of a line connecting a rotation center of the driven component and a rotation center of the rotating component.

In an embodiment of the disclosure, the driving component and the contact component are located on a same side of a line connecting a rotation center of the driven component and a rotation center of the rotating component.

In an embodiment of the disclosure, a line connecting a centroid of the driving component and a rotation center of the rotating component is tilted with respect to a line connecting the centroid of the driving component and a rotation center of the driven component.

In an embodiment of the disclosure, the at least one rotation velocity adjusting mechanism is a plurality of rotation velocity adjusting mechanisms. The rotation velocity adjusting mechanisms surround the fixed axle.

In an embodiment of the disclosure, a distance between the driving component and the rotation center of the driven component is greater than a distance between the contact component and the rotation center of the driven component.

In an embodiment of the disclosure, the rotating device is a vehicle, and the wheel body is a wheel. The wheel is adapted to rotate and drive the main body to move.

In an embodiment of the disclosure, the rotating device is a printing apparatus. The wheel body is a paper roller. A printing paper is adapted to be rolled up by the paper roller, and the paper roller is adapted to rotate and transmit the printing paper.

The rotation velocity adjusting method of the disclosure includes the following steps. A rotating component is driven to rotate with a fixed axle as a rotation axis. A driven component is rotatably connected to the rotating component, and a driving component and a contact component are configured on the driven component. A rotation velocity of the rotating component is made lower than a threshold value, to position the driven component at a first status. The rotation velocity of the rotating component is made greater than the threshold value, so that the driving component drives the driven component through centrifugal force to rotate to a second status. When the driven component is in one of the first status and the second status, the contact component is separated from the fixed axle. When the driven component is in the other one of the first status and the second status, the contact component is in contact with the fixed axle.

In an embodiment of the disclosure, an elastic element is connected between the rotating component and the driven component. Positioning the driven component to the first status includes: positioning the driven component at the first status through the elastic force of the elastic element.

In an embodiment of the disclosure, an elastic element is connected between the rotating component and the driven component. Driving the driven component to rotate to the second status includes: driving the driven component to resist the elastic force of the elastic element and rotate to the second status.

In an embodiment of the disclosure, when the driven component is in the first status, the contact component is separated from the fixed axle. When the driven component is in the second status, the contact component is in contact with the fixed axle to reduce the rotation velocity of the rotating component.

In an embodiment of the disclosure, when the driven component is in the first status, the contact component is in contact with the fixed axle. When the driven component is in the second status, the contact component is separated from the fixed axle to increase the rotation velocity of the rotating component.

In an embodiment of the disclosure, making the rotation velocity of the rotating component greater than the threshold value includes: making the rotation velocity of the rotating component along a first rotation direction greater than the threshold value, or making the rotation velocity of the rotating component along a second rotation direction opposite to the first rotation direction greater than the threshold value.

Based on the above, in the rotation velocity adjusting module of the disclosure, the rotating component is configured to have a driven component adapted to rotate. The driven component rotates when there is sufficient centrifugal force through a driving component. This controls the contact component on the driven component to contact or separate from the fixed axle. Accordingly, the rotation velocity adjusting module can automatically switch to a friction state or a non-friction state based on if the rotation velocity of the rotating component has exceeded a preset threshold value. This can achieve the effects of effectively controlling the rotation velocity of the rotating component, and achieving automatic speed reduction, automatic speed acceleration, or automatic fixed speed.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
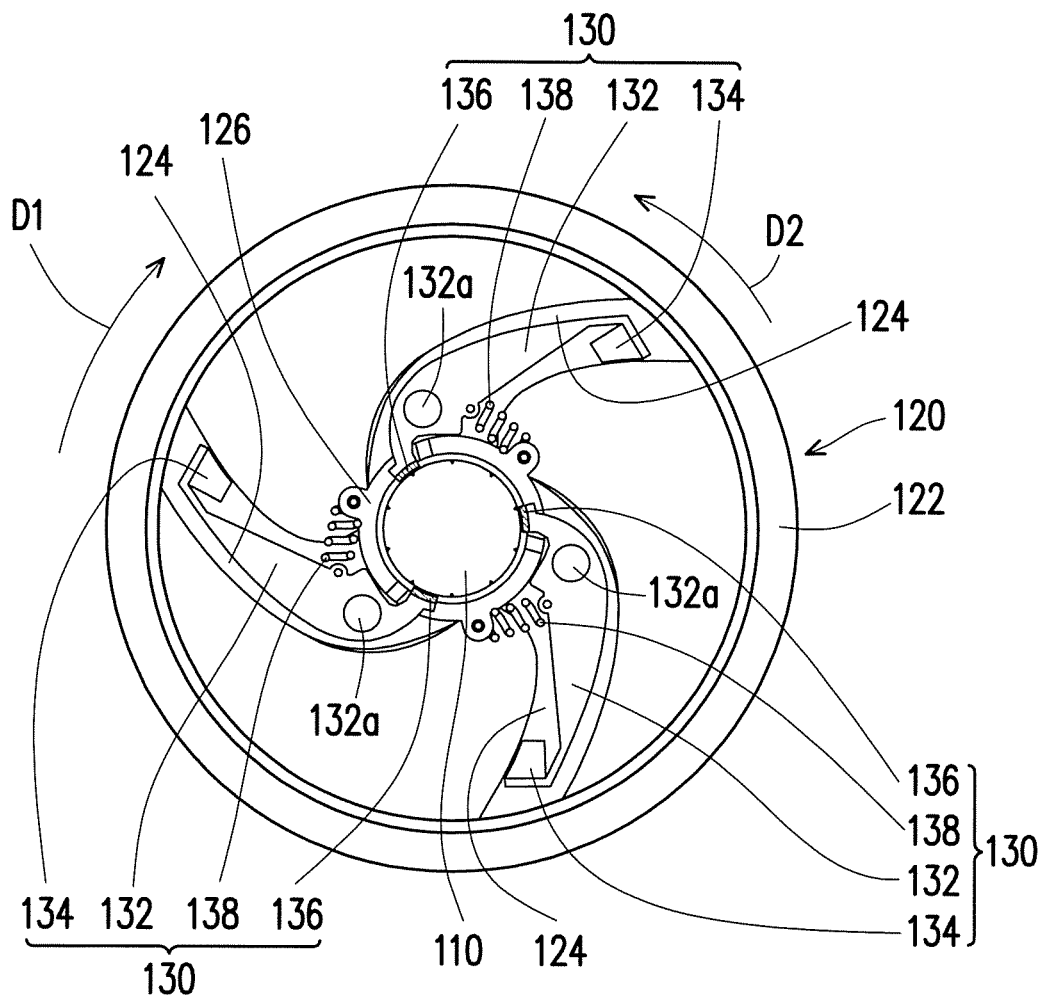
FIG. 1 is a cross sectional view of a rotation velocity adjusting module according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a cross sectional view of a rotation velocity adjusting module according to an embodiment of the disclosure. Referring to FIG. 1, a rotation velocity adjusting module 100 includes a fixed axle 110, a rotating component 120, and a plurality of rotation velocity adjusting mechanisms 130 (three are shown). The rotation velocity adjusting mechanisms 130 surround the fixed axle 110. Each rotation velocity adjusting mechanism 130 includes a driven component 132, a driving component 134, a contact component 136, and an elastic element 138. The driven component 132 is, for example, a shaft. The driving component 134 is, for example, a counterweight. The contact component 136 is, for example, a friction plate. The elastic element 138 is, for example, a spring. However, the disclosure is not limited thereto.

The rotating component 120 is pivoted to the fixed axle 110, and is adapted to rotate with the fixed axle 110 as the rotation axis. Each driven component 132 is rotatably connected to the rotating component 120. Each elastic element 138 is connected between the rotating component 120 and the driven component 132. Specifically, the rotating component 120 includes a frame 122, a plurality of connecting sections (three are shown), and a pivot part 126. The pivot part 126 is pivoted to the fixed axle 110 and connected to the elastic element 138. The frame 122 is connected to the pivot part 126 through the connecting sections 124. Each driven unit 132 is rotatably connected to the connecting section 124 of the rotating component 120 through a corresponding pivot 132a. In other embodiments, the rotating component 120 can be other suitable structures. The disclosure is not limited thereto.

Figure 2A:
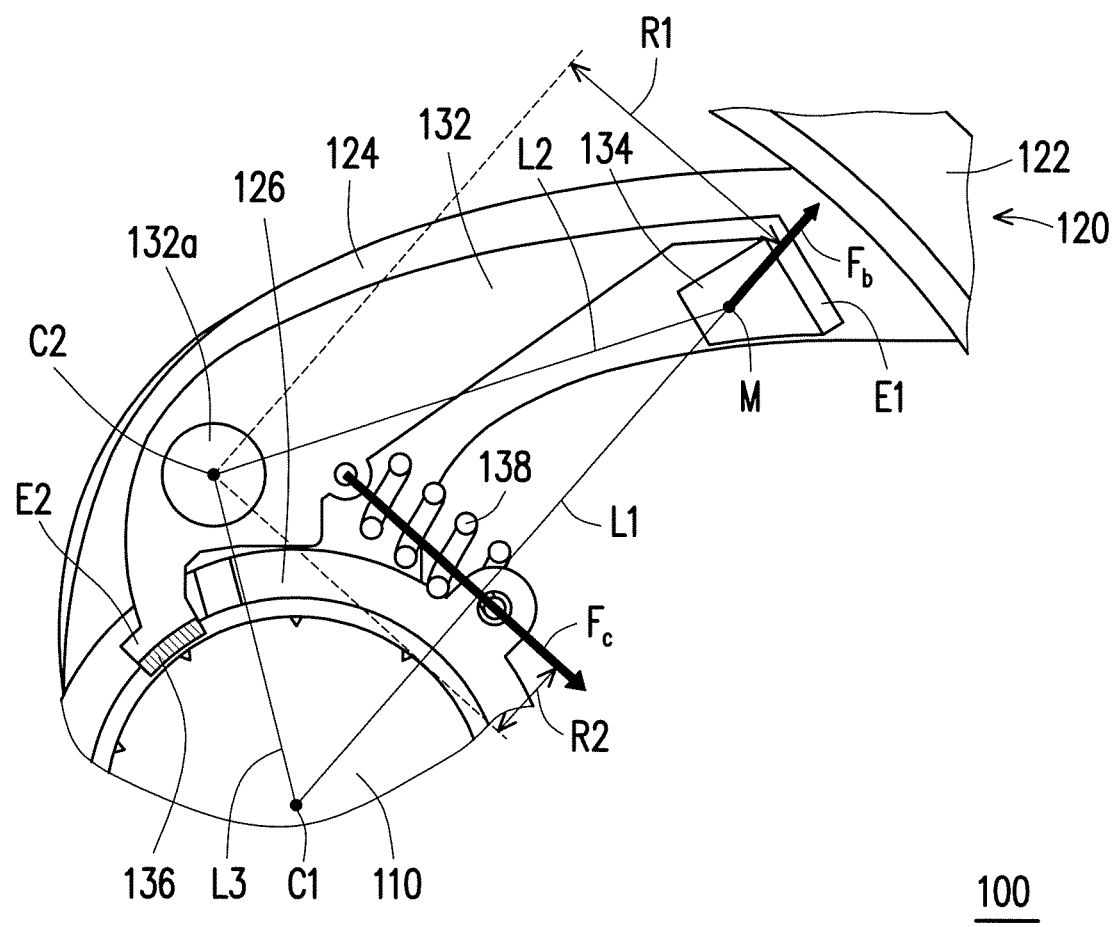
FIG. 2A is a partially enlarged view of the rotation velocity adjusting module of FIG. 1.

FIG. 2A is a partially enlarged view of the rotation velocity adjusting module of FIG. 1. As seen in FIG. 2A, the driven component 132 includes a first end E1 and a second end E2. The driving component 134 is disposed on the first end E1, and the contact component 136 is disposed on the second end. In the embodiment, the driving element 134 is fixed on the first end E1 through, for example, adhering, engaging, screwing or other suitable methods. The contact element 136 is fixed on the second end E2 through, for example, adhering, engaging, screwing or other suitable methods. The disclosure is not limited thereto. When the rotation velocity of the rotating component 120 is greater than a threshold value, the driving component 134 drives the driven component 132 to rotate through centrifugal force, to switch a status of the contact component 136. This adjusts the rotation velocity of the rotating component 120. The following figures will explain this in detail.

Figure 2B:
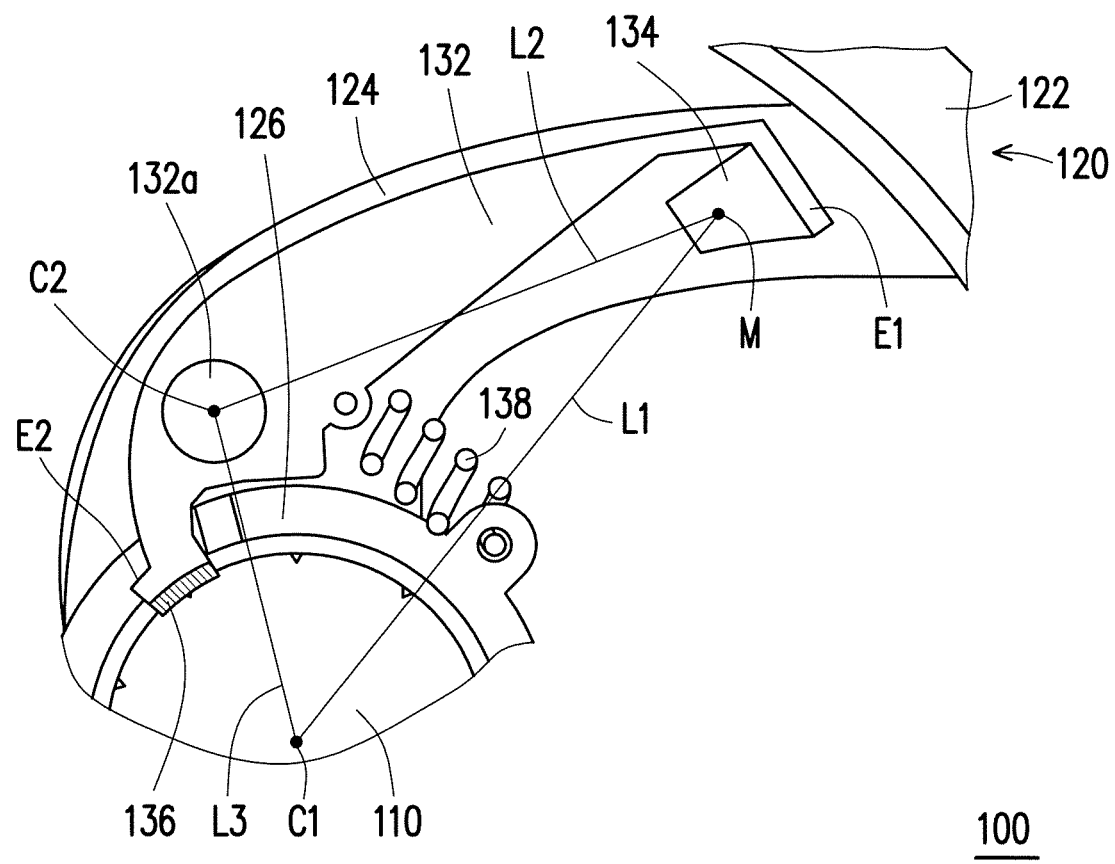
FIG. 2B shows a driven component of FIG. 2A rotating counterclockwise.

FIG. 2B shows a driven component of FIG. 2A rotating counterclockwise. When a rotation velocity of the rotating component 120 is lower than the threshold value, the centrifugal force generated is not great enough to resist the elastic force of the elastic element 138 to cause the driven component 132 to rotate. At this point, the driven component 132 is positioned at a first status as shown in FIG. 2A through the elastic force of the elastic element 138. In the first status, the contact component 136 is separated from the fixed axle 110 to be in a non-friction state. When a rotation velocity of the rotating component 120 is greater than the threshold value, the centrifugal force generated increases. At this point, the driving component 134 drives the driven component 132 through centrifugal force to resist the elastic force of the elastic element 138 and rotate to a second status shown in FIG. 2B. In the second status, the contact component 136 is in contact with the fixed axle 110 to be in a friction state. This way, the rotation velocity of the rotating component 120 is reduced through the frictional force between the contact component 136 and the fixed axle 110.

In the configuration described above, the rotation velocity adjusting module 100 can automatically switch to a friction state or a non-friction state based on if the rotation velocity of the rotating component 120 has exceeded a preset threshold value. This way, the rotation velocity of the rotating component 120 can be effectively controlled. It should be noted that in the embodiment, regardless of if the rotation velocity of the rotating component 120 in the first direction D1 (clockwise) as shown in FIG. 1 is greater than the threshold value, or if the rotation velocity of the rotating component 120 in the second direction D2 (counterclockwise) as shown in FIG. 1 is greater than the threshold value, the driving component 134 will drive the driven component 132 to rotate to the second status through centrifugal force.

Referring to FIG. 2A, in the embodiment, a line L1 connecting a centroid M of the driving component 134 and a rotation center C1 of the rotating component 120 is tilted with respect to a line L2 connecting the centroid M of the driving component 134 and a rotation center C2 of the driven component 132. That is to say, the line L1 and the line L2 are not parallel with each other. This way, the centrifugal force from the rotation center C1 towards the centroid M is able to drive the driven component 132 to rotate with the rotation center C2 is the rotation axis. In addition, the driving component 134 and the contact component 136 are respectively located two opposite sides of a line L3 connecting the rotation center C1 of the driven component 132 and a rotation center C2 of the rotating component 120. Thus the driven component 132 rotating in the counterclockwise direction drives the contact component 136 to abut and engage the fixed axle 110. Furthermore, a distance between the driving component 134 and the rotation center C2 of the driven component 132 is greater than a distance between the contact component 136 and the rotation center C2 of the driven component 132. This way, there is a larger moment arm between the driving component 134 and the rotation center C2 of the driven component 132. Thus, the weight requirement of the driven component 134 is lower, and the overall weight of the module is also reduced.

Figure 3:
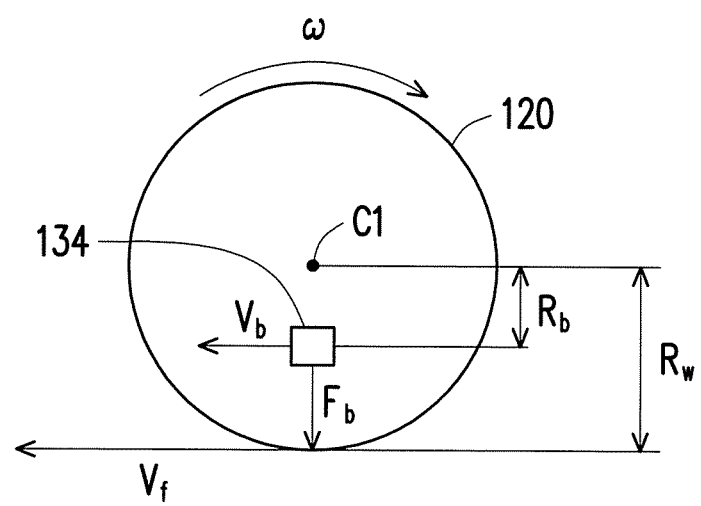
FIG. 3 is a schematic view of a rotating component and a driving component of FIG. 1.

The following will describe the threshold value of the rotation velocity of the rotating component 120. FIG. 3 is a schematic view of a rotating component and a driving component of FIG. 1. Referring to FIG. 3, $V_f$ is a tangential velocity at the circumference of the rotating component 120 which corresponds to the angular velocity $\omega$ referenced in FIG. 3. $V_f$ and $\omega$ are a rotation velocity threshold of the rotating component 120. When the rotation velocity of the rotating component 120 reaches the threshold, the rotation velocity adjusting module 100 automatically switches between a friction state and a non-friction state as described above. $F_b$ is a centrifugal force of the driving component 134, $V_b$ is a velocity of the driving component 134, $R_b$ is a distance between the driving component 134 and the rotation center C1 of the rotating component 120, and $R_w$ is a radius of the rotating component 120. If the mass of the driving component 134 is m, from Newtonian mechanics, the formula for centrifugal force is $F_b=mV_b^2/R_b$, and $V_b=V_fR_b/R_w$, therefore $F_b=m(V_fR_b/R_w)^2/R_b=mV_f^2R_bR_w^2$. Referring to FIG. 2A and FIG. 3, the centrifugal force $F_b$ applied to the driving component 134 has a moment arm of R1 relative to the rotation center C2 of the driven component 132. The elastic force of the elastic element 138 is $F_c$. The elastic force has a moment arm of R2 relative to the rotation center C2 of the driven component 132. If the threshold value is set to be $V_f$, the moment balance equation $F_bR1=F_cR2$ must be satisfied; that is to say, $F_cR2/R1=mV_f^2R_bR_w^2$ must be satisfied.

Figure 4:
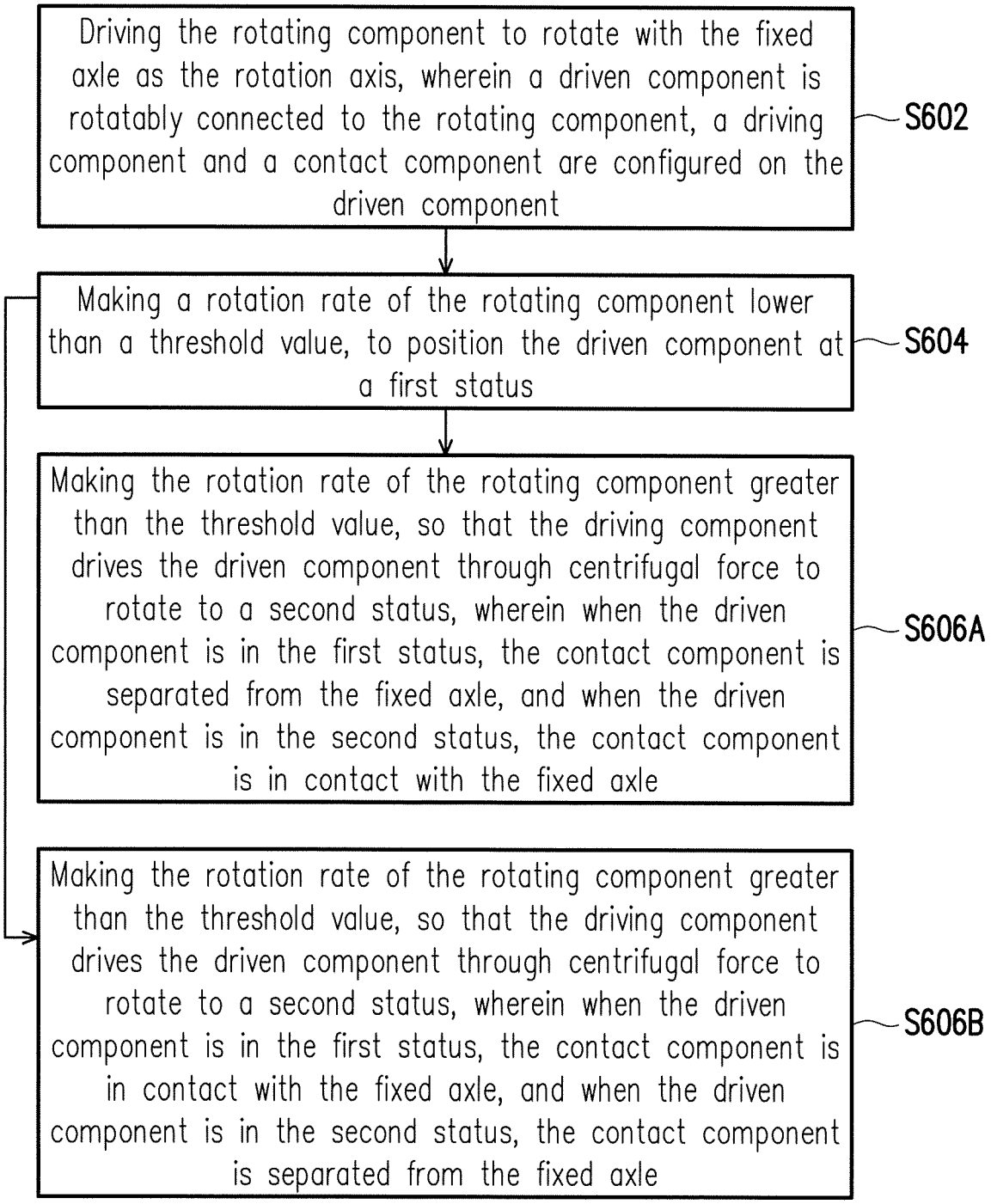
FIG. 4 is a flow chart of a rotation velocity adjusting method of a rotation velocity adjusting module according to an embodiment of the disclosure.

The following figures will describe the rotation velocity adjusting method corresponding to the embodiment of the rotation velocity adjusting module 100. FIG. 4 is a flow chart of a rotation velocity adjusting method of a rotation velocity adjusting module according to an embodiment of the disclosure. Referring to FIG. 4, in step S602, the rotating component 120 is driven to rotate with the fixed axle 110 as the rotation axis. The driven component 132 is rotatably connected to the rotating component 120. The driving component 134 and the contact component 136 are configured on the driven component 132. In step S604, a rotation velocity of the rotating component 120 is made lower than a threshold value, to position the driven component at a first status. In step S606A, the rotation velocity of the rotating component 120 is made greater than the threshold value, so that the driving component 134 drives the driven component 132 through centrifugal force to rotate to a second status. When the driven component 132 is in the first status, the contact component 136 is separated from the fixed axle 110. When the driven component 132 is in the second status, the contact component 136 is in contact with the fixed axle 110.

Figure 5A:
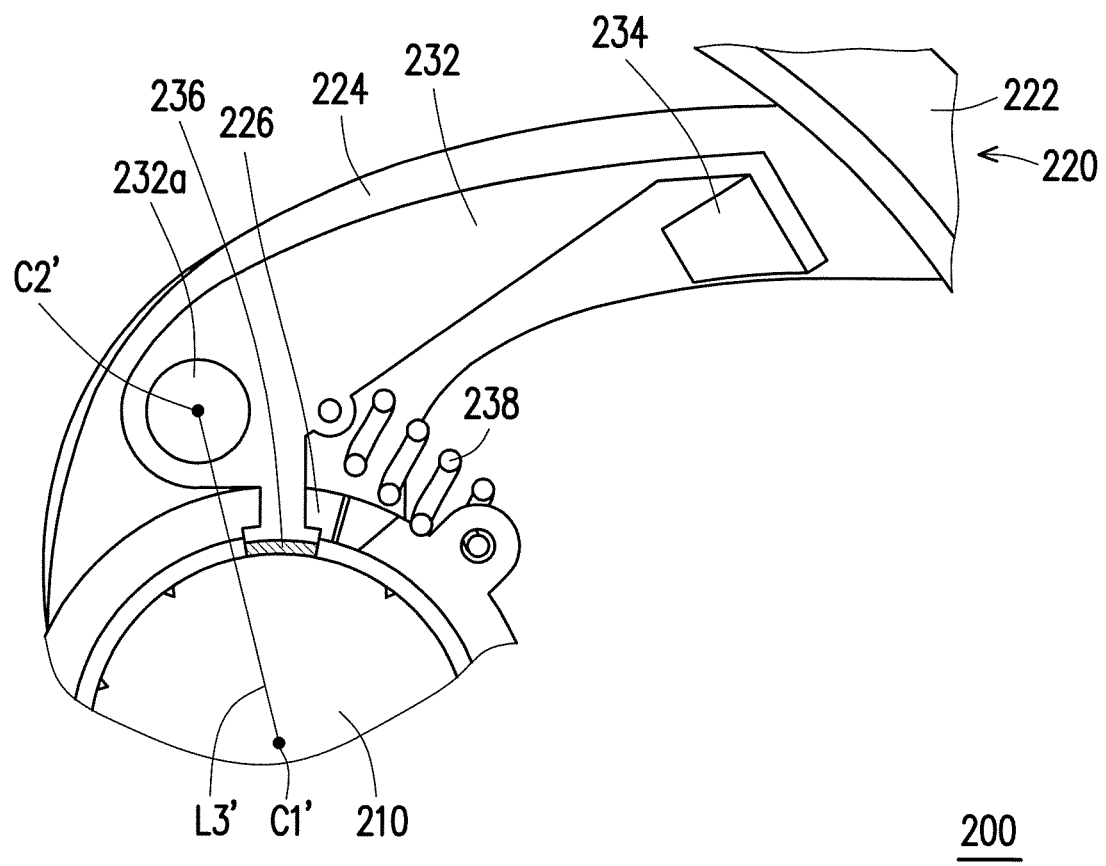
FIG. 5A is a partially enlarged view of a rotation velocity adjusting module according to an embodiment of the disclosure.
Figure 5B:
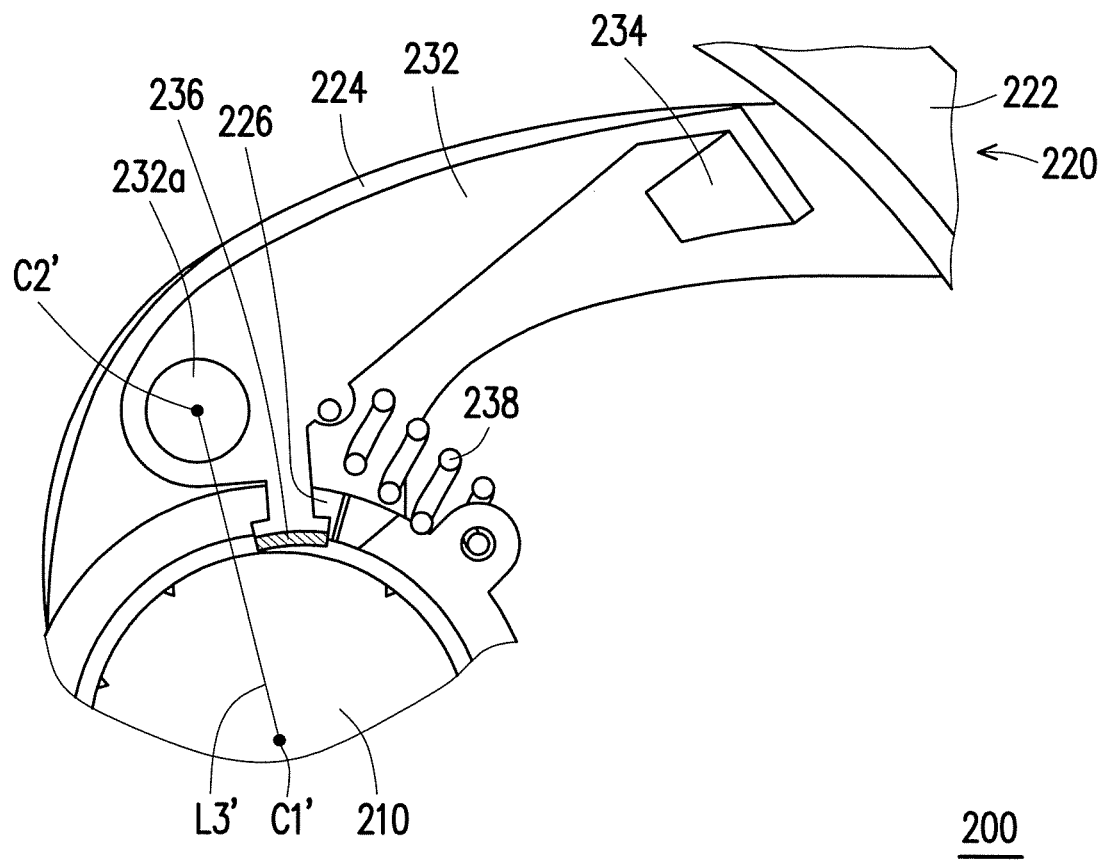
FIG. 5B shows a driven component of FIG. 5A rotating counterclockwise.

FIG. 5A is a partially enlarged view of a rotation velocity adjusting module according to an embodiment of the disclosure. FIG. 5B shows a driven component of FIG. 5A rotating counterclockwise. In the rotations velocity adjusting module 200 of FIG. 5A, the configuration and functions of the fixed axle 210, the rotating component 220, the frame 222, the connecting section 224 the pivot part 226, the driven component 232, the driving component 234, the contact component 236, the elastic element 238, and the pivot 232a is similar to the fixed axle 110, the rotating component 120, the frame 122, the connecting section 124 the pivot part 126, the driven component 132, the driving component 134, the contact component 136, the elastic element 138, and the pivot 132a of FIG. 2A. The same will not be repeated herein. The difference between the embodiment of FIG. 5A and the embodiment of FIG. 2A is that the driving component 234 and the contact component 236 are located on a same side of a line L3' connecting a rotation center C2' of the driven component 232 and a rotation center C1' of the rotating component 220. This way, the driven component 232 rotating in the counterclockwise direction drives the contact component 236 to separate from the fixed axle 210. That is to say, in the embodiment of FIG. 5A, when a rotation velocity of the rotating component 220 is lower than a threshold value, the driven component 232 is positioned at a first status. In the first status, the contact component 236 is in contact with the fixed axle 210 through the elastic force of the elastic element 238. When the rotation velocity of the rotating component 220 is greater than a threshold value, the driven component 232 is rotated to a second status shown in FIG. 5B. In the second status, the contact component 236 is separated from the fixed axle 210 to increase the rotation velocity of the rotating component 220.

The following descriptions correspond to the rotation adjustment module of the embodiment of FIG. 5A to describe the rotation velocity adjusting method. Referring to FIG. 4, FIG. 5A, and FIG. 5B, the in step S602, the rotating component 220 is driven to rotate with the fixed axle 210 as the rotation axis. The driven component 232 is rotatably connected to the rotating component 220. The driving component 234 and the contact component 236 are configured on the driven component 232. In step S604, a rotation velocity of the rotating component 220 is made lower than a threshold value, to position the driven component 232 at a first status. In step S606B, the rotation velocity of the rotating component 220 is made greater than the threshold value, so that the driving component 234 drives the driven component 132 through centrifugal force to rotate to a second status. When the driven component 232 is in the first status, the contact component 236 is in contact with the fixed axle 210. When the driven component 232 is in the second status, the contact component 236 is separated from the fixed axle 210.

The following is a comparison of the embodiment of FIG. 2A and the embodiment of FIG. 5A. In the embodiment of FIG. 2A, the rotation velocity is automatically reduced when the rotation velocity of the rotating component exceeds a threshold value. This embodiment is suitable to be applied in, for example, scooters to prevent the scooter from going too fast. Or, the embodiment can be applied in handheld printing devices to prevent a paper roller from rolling too fast. On the contrary, in the embodiment of FIG. 5A, the rotation velocity is automatically increased when the rotation velocity of the rotating component exceeds a threshold value. This embodiment is suitable to be applied in, for example, vehicles that require acceleration, or applied in vehicle accelerators. The disclosure is not limited thereto.

Figure 6:
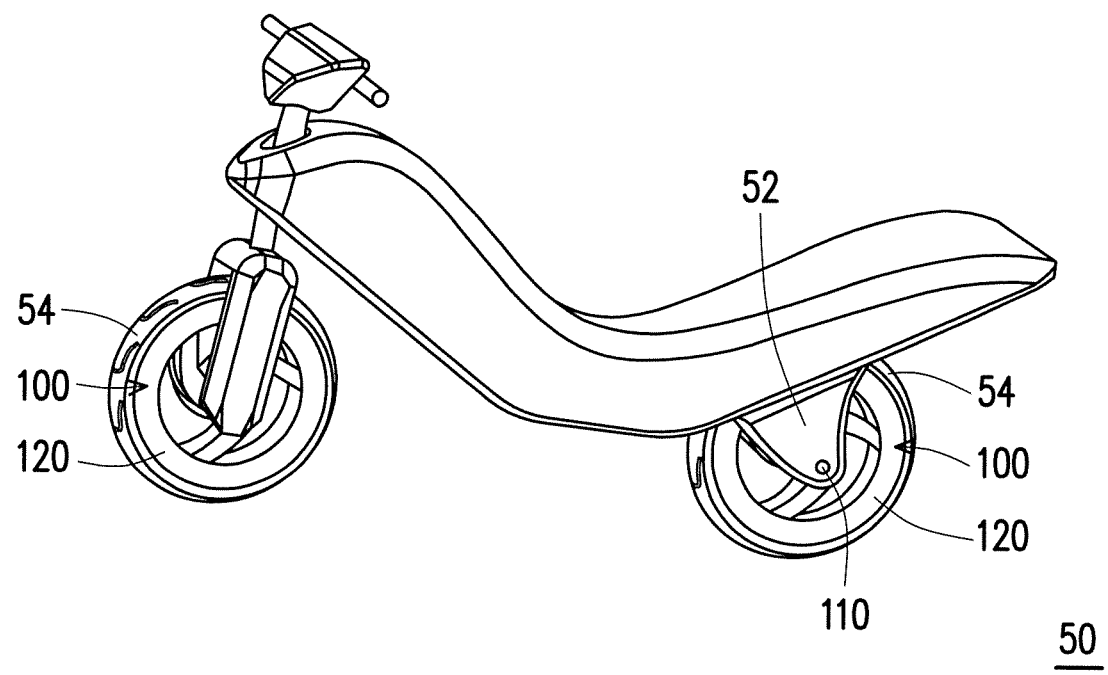
FIG. 6 is a three dimensional schematic view of a vehicle according to an embodiment of the disclosure.

The following descriptions and figures describe a rotating device having the rotation adjustment module of the previous embodiments. FIG. 6 is a three dimensional schematic view of a vehicle according to an embodiment of the disclosure. Referring to FIG. 6, the rotating device of the embodiment is a vehicle 50. The vehicle 50 is, for example, a scooter, and includes a main body 52, a plurality of wheel bodies 54 (two are shown), and a plurality of rotation velocity adjusting modules 100 of FIG. 1. The main body 52 is connected to the fixed axle 110 of each of the rotation velocity adjusting modules 100. Each wheel body 54 is connected to the rotating component 120 of the corresponding rotation velocity adjusting, module 100. The wheel bodies 54 are adapted to rotate to drive the main body 52 to move. The wheel bodies 54 have the automatic speed reduction effects through the rotation velocity adjusting module 100 described in FIG. 1 to FIG. 3. This can prevent the speed of the vehicle 50 from being too fast, which may affect the safety of a child riding it.

Figure 7:
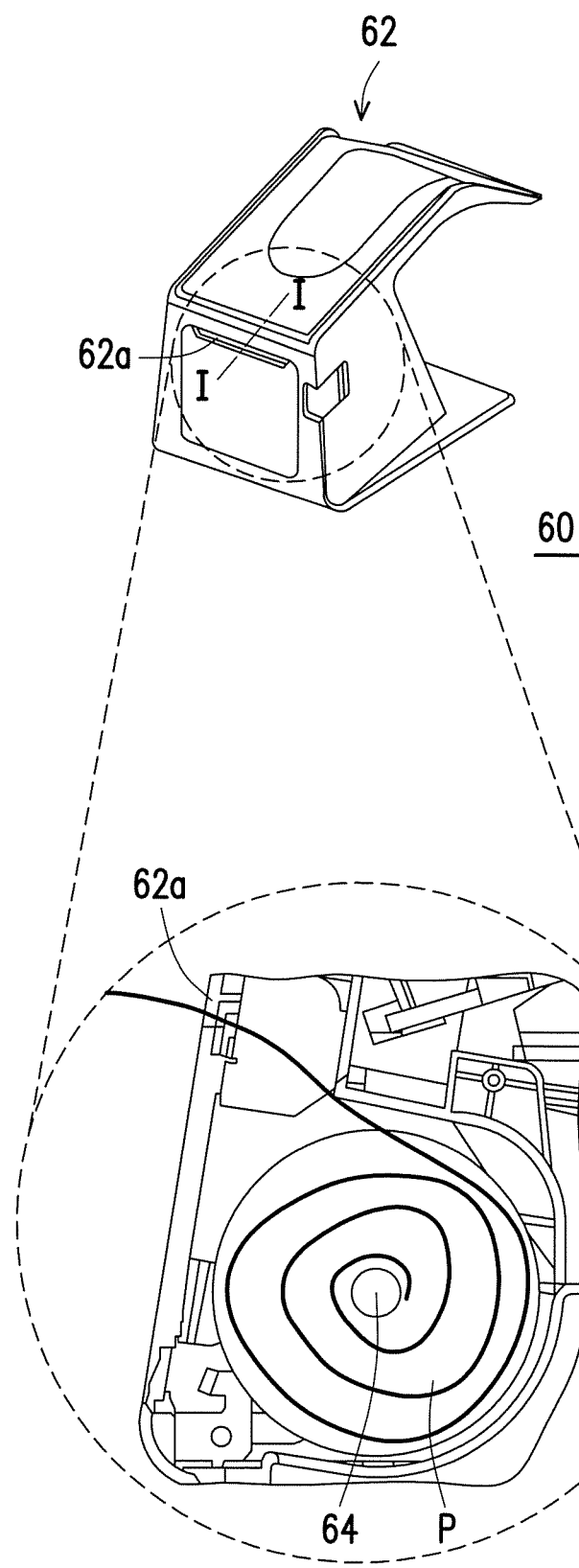
FIG. 7 is a three dimensional schematic view of a printing apparatus according to an embodiment of the disclosure.
Figure 8:
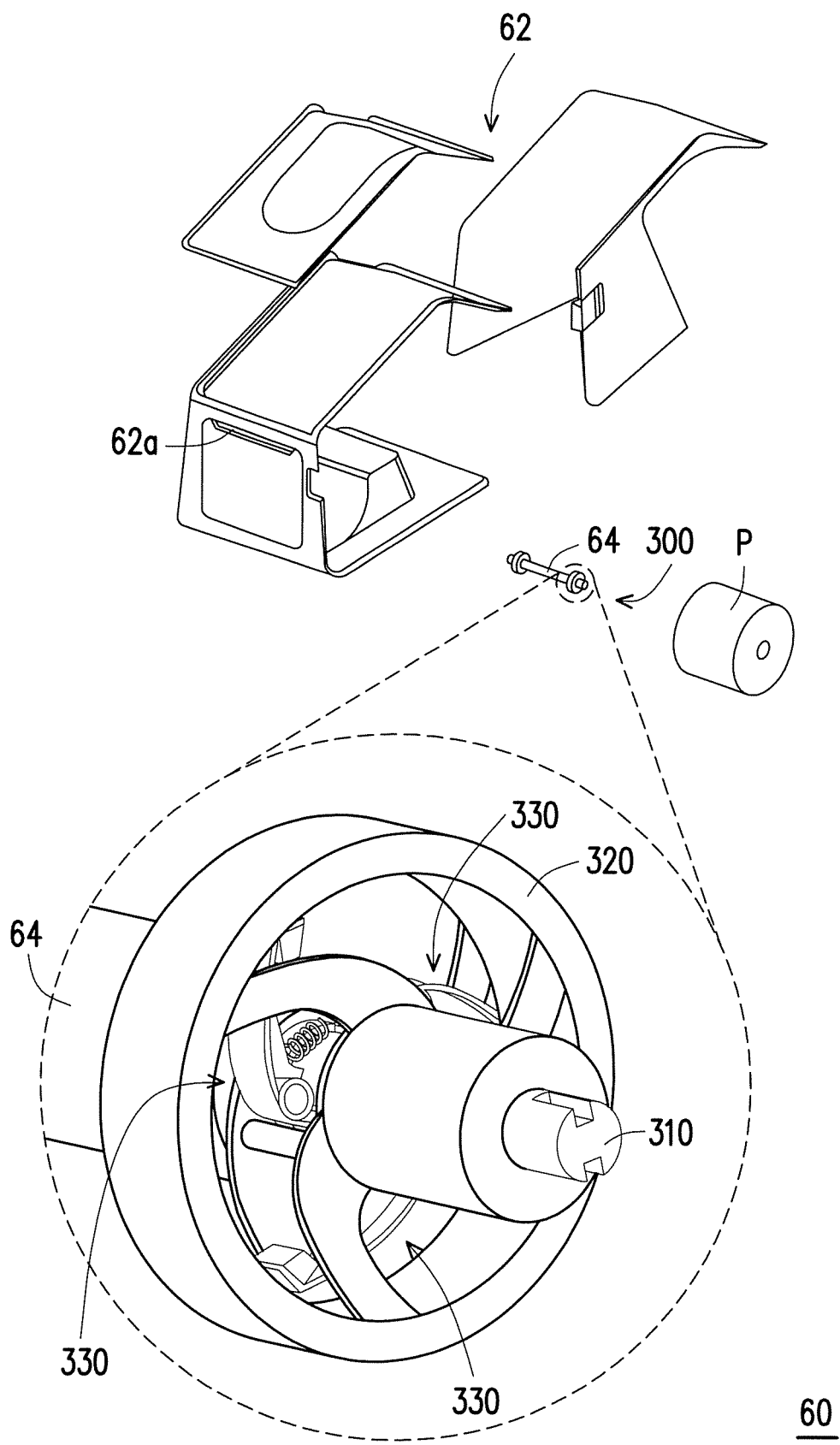
FIG. 8 is an exploded view of the printing apparatus of FIG. 7.

FIG. 7 is a three dimensional schematic view of a printing apparatus according to an embodiment of the disclosure. FIG. 8 is an exploded view of the printing apparatus of FIG. 7. Referring to FIG. 7 and FIG. 8, the rotating device of the embodiment is a printing apparatus 60. The printing apparatus 60 includes a main body 62, a wheel body 64 (shown as a paper roller), and a rotation velocity adjusting module 300. The wheel body 64 is disposed in the main body 62. A printing paper P is rolled up and winded around the wheel body 64. The wheel body 64 is adapted to rotate and transmit the printing paper P. This allows the printing paper P to be printed and transmitted out of an exit 62a of the main body 62.

Figure 9:
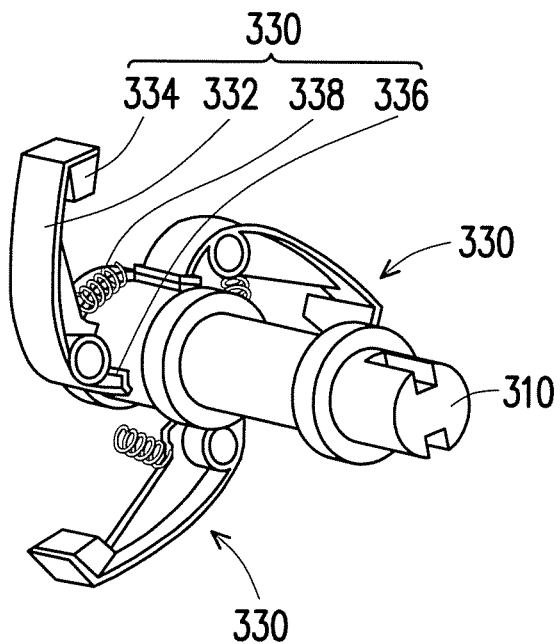
FIG. 9 is a partial view of the components of the rotation velocity adjusting module of FIG. 8.
Figure 10:
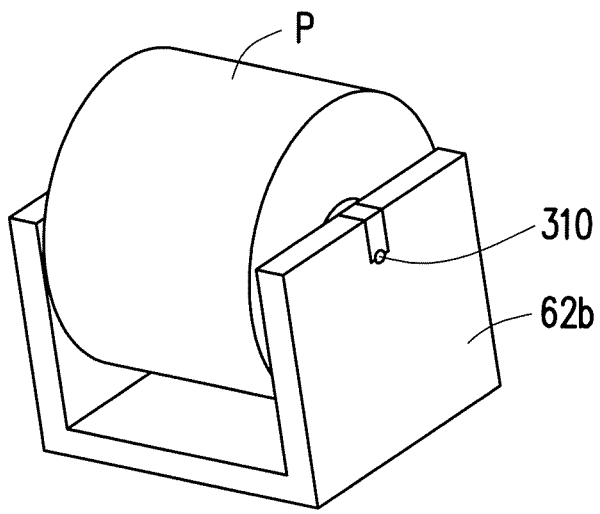
FIG. 10 is a view showing a fixed axle of FIG. 8 fixed to a supporting structure.

FIG. 9 is a partial view of the components of the rotation velocity adjusting module of FIG. 8. FIG. 10 is a view showing a fixed axle of FIG. 8 fixed to a supporting structure. Referring to FIG. 8 to FIG. 10, the rotation velocity adjusting module 300 includes a fixed axle 310, a rotating component 320, and a plurality of rotation velocity adjusting mechanisms 330 (three are shown). The main body 62 is connected to the fixed axle 310. The main body 62 supports the fixed axle 310 by, for example, a supporting structure 62b in the main body 62. The wheel body 64 is connected to the rotating component 320.

The rotation velocity adjusting mechanisms 330 surround the fixed axle 310. Each rotation velocity adjusting mechanism 330 includes a driven component 332, a driving component 334, a contact component 336, and an elastic element 338. Similar to the configurations in FIG. 1, the rotating component 320 of the embodiment is pivoted to the fixed axle 310, and rotates with the fixed axle 310 as a rotation axis. Each driven component 332 is rotatably connected to the rotating component 320. Each elastic element 338 is connected between the rotating component 320 and the driven component 332. The driving component 334 and the contact component 336 are respectively disposed on two opposite ends of the driven component 332. In the embodiment, the driving element 334 is fixed on the driven component 332 through, for example, adhering, engaging, screwing or other suitable methods. The contact element 336 is fixed on the driven component 332 through, for example, adhering, engaging, screwing or other suitable methods. The disclosure is not limited thereto.

Similar to the actions of the embodiment of claim 1, in the embodiment, when a rotation velocity of the rotating component 320 is lower than the threshold value, the centrifugal force generated is not great enough to resist the elastic force of the elastic element 338 to cause the driven component 332 to rotate. At this point, the driven component 332 is positioned at a first status through the elastic force of the elastic element 338. In the first status, the contact component 336 is separated from the fixed axle 310 to be in a non-friction state. When a rotation velocity of the rotating component 320 is greater than the threshold value, the centrifugal force generated increases. At this point, the driving component 334 drives the driven component 332 through centrifugal force to resist the elastic force of the elastic element 338 and rotate to a second status. In the second status, the contact component 336 is in contact with the fixed axle 310 to be in a friction state. This way, the rotation velocity of the rotating component 320 is reduced through the frictional force between the contact component 336 and the fixed axle 310. This automatic speed reduction effect can prevent the wheel body 64 from rotating too fast and affecting printing quality.

To sum up, in the rotation velocity adjusting module of the disclosure, the rotating component is configured to have a driven component adapted to rotate. The driven component rotates when there is sufficient centrifugal force through a driving component. This controls the contact component on the driven component to contact or separate from the fixed axle. Accordingly, the rotation velocity adjusting module can automatically switch to a friction state or a non-friction state based on if the rotation velocity of the rotating component has exceeded a preset threshold value. This can achieve the effects of effectively controlling the rotation velocity of the rotating component, and achieving automatic speed reduction, automatic speed acceleration, and automatic fixed speed.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A rotation velocity adjusting module, comprising:
a fixed axle;
a rotating component, pivoted to the fixed axle and adapted to rotate with the fixed axle as a rotation axis; and
at least one rotation velocity adjusting mechanism, comprising:
a driven component, rotatably connected to the rotating component and having a first end and a second end;
a driving component, disposed on the first end; and
a contact component, disposed on the second end, wherein when a rotation velocity of the rotating component reaches a threshold value, the driving component drives the driven component to rotate through a change of centrifugal force, so as to switch a status of the contact component,
wherein when the rotation velocity of the rotating component is lower than the threshold value, the driven component is positioned at a first status, and when the rotation velocity of the rotating component is greater than the threshold value, the driving component drives the driven component to rotate to a second status through centrifugal force; and
wherein when the driven component is in the first status, the contact component is completely separated from the fixed axle, and when the driven component is in the second status, the contact component is in complete contact with the fixed axle to reduce the rotation velocity of the rotating component.

2. The rotation velocity adjusting module as claimed in claim 1, wherein the rotation velocity adjusting mechanism includes an elastic element, the elastic element is connected between the rotating component and the driven component, when the rotation velocity of the rotating component is lower than the threshold value, the driven component is positioned at the first status through an elastic force of the elastic element, and when the rotation velocity of the rotating component is greater than the threshold value, the driving component drives the driven component through centrifugal force to resist the elastic force of the elastic element and rotate to the second status.

3. The rotation velocity adjusting module as claimed in claim 1, wherein when the rotation velocity of the rotating component along a first rotation direction is greater than the threshold value, the driving component drives the driven component through centrifugal force to rotate to the second status, and when the rotation velocity of the rotating component along a second rotation direction opposite to the first rotation direction is greater than the threshold value, the driving component drives the driven component through centrifugal force to rotate to the second status.

4. The rotation velocity adjusting module as claimed in claim 1, wherein the driving component and the contact component are respectively located on two opposite sides of a line connecting a rotation center of the driven component and a rotation center of the rotating component.

5. The rotation velocity adjusting module as claimed in claim 1, wherein the driving component and the contact component are located on a same side of a line connecting a rotation center of the driven component and a rotation center of the rotating component.

6. The rotation velocity adjusting module as claimed in claim 1, wherein a line connecting a centroid of the driving component and a rotation center of the rotating component is tilted with respect to a line connecting the centroid of the driving component and a rotation center of the driven component.

7. The rotation velocity adjusting module as claimed in claim 1, wherein the at least one rotation velocity adjusting mechanism is a plurality of rotation velocity adjusting mechanisms, and the rotation velocity adjusting mechanisms surround the fixed axle.

8. The rotation velocity adjusting module as claimed in claim 1, wherein a distance between the driving component and a rotation center of the driven component is greater than a distance between the contact component and the rotation center of the driven component.

9. A rotating device, comprising:
 a rotation velocity adjusting module, comprising:
  a fixed axle;
  a rotating component, pivoted to the fixed axle and adapted to rotate with the fixed axle as a rotation axis; and
  at least one rotation velocity adjusting mechanism, comprising:
   a driven component, rotatably connected to the rotating component and having a first end and a second end, wherein when a rotation velocity of the rotating component is less than a threshold value, the driven component is positioned at a first status;
   a driving component, disposed on the first end, wherein when the rotation velocity of the rotating component is greater than the threshold value, the driving component drives the driven component to rotate to a second status through centrifugal force; and
   a contact component, disposed on the second end, wherein when the driven component is in one of the first status or the second status, the contact component is separated from the fixed axle, and when the driven component is in the other one of the first status or the second status, the contact component is in contact with the fixed axle;
 a main body, connected to the fixed axle; and
 a wheel body, connected to the rotating component, wherein the wheel body is adapted to rotate, and
 wherein when the driven component is in the first status, the contact component is completely separated from the fixed axle, and when the driven component is in the second status, the contact component is in complete contact with the fixed axle to reduce the rotation velocity of the rotating component.

10. The rotating device as claimed in claim 9, wherein the rotation velocity adjusting mechanism includes an elastic element, the elastic element is connected between the rotating component and the driven component, when the rotation velocity of the rotating component is lower than the threshold value, the driven component is positioned at the first status through an elastic force of the elastic element, and when the rotation velocity of the rotating component is greater than the threshold value, the driving component drives the driven component through centrifugal force to resist the elastic force of the elastic element and rotate to the second status.

11. The rotating device as claimed in claim 9, wherein when the rotation velocity of the rotating component along a first rotation direction is greater than the threshold value, the driving component drives the driven component through centrifugal force to rotate to the second status, and when the rotation velocity of the rotating component along a second rotation direction opposite to the first rotation direction is greater than the threshold value, the driving component drives the driven component through centrifugal force to rotate to the second status.

12. The rotating device as claimed in claim 9, wherein the driving component and the contact component are respectively located on two opposite sides of a line connecting a rotation center of the driven component and a rotation center of the rotating component.

13. The rotating device as claimed in claim 9, wherein the driving component and the contact component are respectively located on a same side of a line connecting a rotation center of the driven component and a rotation center of the rotating component.

14. The rotating device as claimed in claim 9, wherein a line connecting a centroid of the driving component and a rotation center of the rotating component is tilted with respect to a line connecting the centroid of the driving component and a rotation center of the driven component.

15. The rotating device as claimed in claim 9, wherein the at least one rotation velocity adjusting mechanism is a plurality of rotation velocity adjusting mechanisms, and the rotation velocity adjusting mechanisms surround the fixed axle.

16. The rotating device as claimed in claim 9, wherein a distance between the driving component and a rotation center of the driven component is greater than a distance between the contact component and the rotation center of the driven component.

17. The rotating device as claimed in claim 9, wherein the rotating device is a vehicle, the wheel body is a wheel, and the wheel is adapted to rotate and drive the main body to move.

18. The rotating device as claimed in claim 9, wherein the rotating device is a printing apparatus, the wheel body is a paper roller, a printing paper is adapted to be rolled up by the paper roller, and the paper roller is adapted to rotate and transmit the printing paper.

19. A rotation velocity adjusting method, comprising:
 driving a rotating component to rotate with a fixed axle as a rotation axis, wherein a driven component is rotatably connected to the rotating component, and a driving component and a contact component are configured on the driven component;
 making a rotation velocity of the rotating component lower than a threshold value, to position the driven component at a first status; and
 making the rotation velocity of the rotating component greater than the threshold value, so that the driving component drives the driven component through centrifugal force to rotate to a second status,
 wherein when the driven component is in one of the first status and the second status, the contact component is separated from the fixed axle, and when the driven component is in the other one of the first status and the second status, the contact component is in contact with the fixed axle, and wherein when the driven component is in the first status, the contact component is completely separated from the fixed axle, and when the driven component is in the second status, the contact component is in complete contact with the fixed axle to reduce the rotation velocity of the rotating component.

20. The rotation velocity adjusting method as claimed in claim 19, wherein an elastic element is connected between the rotating component and the driven component, and positioning the driven component to the first status includes:
   positioning the driven component at the first status through an elastic force of the elastic element.

21. The rotation velocity adjusting method as claimed in claim 19, wherein an elastic element is connected between the rotating component and the driven component, and driving the driven component to rotate to the second status includes:
   driving the driven component to resist an elastic force of the elastic element and rotate to the second status.

22. The rotation velocity adjusting method as claimed in claim 19, wherein making the rotation velocity of the rotating component greater than the threshold value includes:
   making the rotation velocity of the rotating component along a first rotation direction greater than the threshold value, or making the rotation velocity of the rotating component along a second rotation direction opposite to the first rotation direction greater than the threshold value.

\* \* \* \* \*